US011901806B2

(12) United States Patent
Saccomanno et al.

(10) Patent No.: US 11,901,806 B2
(45) Date of Patent: Feb. 13, 2024

(54) DISCONNECT SWITCH FOR BOOST CONVERTER (71) Applicant: Apple Inc., Cupertino, CA (US)

(72) Inventors: Giovanni Saccomanno, Munich (DE);
Bogdan-Eugen Matei, Munich (DE);
Yesim Inam, Munich (DE)

(73) Assignee: Apple Inc., Cupertino, CA (US)

( * ) Notice: Subject to any disclaimer, the term of this patent is extended or adjusted under 35 U.S.C. 154(b) by 224 days.

(21) Appl. No.: 17/484,957

(22) Filed: Sep. 24, 2021

(65) Prior Publication Data
US 2023/0116750 A1    Apr. 13, 2023

(51) Int. Cl.
*H02M 1/32* (2007.01)
*H02M 3/158* (2006.01)

(52) U.S. Cl.
CPC .......... *H02M 1/32* (2013.01); *H02M 3/1582* (2013.01)

(58) Field of Classification Search
CPC .......................... H02M 1/32; H02M 3/1582
See application file for complete search history.

(56) References Cited

U.S. PATENT DOCUMENTS

| 8,248,044 | B2 * | 8/2012 | Brown ............... H02M 3/1588 323/224 |
| 9,287,772 | B2 | 3/2016 | Hussien et al. |
| 10,355,590 | B2 | 7/2019 | Kwak et al. |
| 10,686,377 | B1 * | 6/2020 | Lu ........................ H02M 3/158 |
| 2018/0196453 | A1 * | 7/2018 | Sasmal .................. G05F 1/575 |
| 2019/0098710 | A1 * | 3/2019 | Murakami ............ H05B 45/00 |

* cited by examiner

*Primary Examiner* — Rafael O De Leon Domenech
(74) *Attorney, Agent, or Firm* — Kowert, Hood, Munyon, Rankin & Goetzel, P.C.; Erik A. Heter; Dean M. Munyon (57) ABSTRACT A disconnect switch for a power converter is disclosed. An apparatus includes an inductor coupled between an input power supply node and a switch node, and a converter circuit configured to generate a particular voltage level on a boost node using a voltage level of the switch node. An output circuit is configured to provide the particular voltage level on the regulated power supply node using a voltage level of the boost node. In response to a determination that the regulated power supply node has been shorted to ground, the output circuit is configured isolate the boost node from the regulated power supply node. In response to a detection of a regulation event, the output circuit is configured to reduce the voltage level of the boost node to generate a reduced voltage on the regulated power supply node.

20 Claims, 9 Drawing Sheets

DISCONNECT SWITCH FOR BOOST CONVERTER

BACKGROUND

Technical Field

This disclosure is directed to electronic circuits, and more particularly, to power converter circuits.

Description of the Related Art

Computer systems may include multiple circuit blocks configured to perform specific functions. Such circuit blocks may be fabricated on a common substrate and may employ different power supply voltage levels. Power management units (commonly referred to as "PMUs") may include multiple power converter circuits configured to generate regulated voltage levels for various power supply signals. Such power converter circuits may employ a regulator circuit that includes both passive circuit elements (e.g., inductors, capacitors, etc.) as well as active circuit elements (e.g., transistors, diodes, etc.). Categories of power converters include both linear power converters and switching power converters.

Switching power converters include both buck converters and boost converters. In a buck converter, the input voltage is greater than the regulated supply voltage provided as an output. In a boost converter, the regulated supply voltage is greater than the input voltage. The former may operate by exchanging voltage for current, while the latter may exchange current for voltage. Both buck and boost converters may include one or more switching elements and one or more energy storage elements (e.g., inductors). A wide variety of different schemes may be used to control the operation of switching power converters.

SUMMARY

A disconnect switch for a power converter is disclosed. In one embodiment, an apparatus includes an inductor coupled between an input power supply node and a switch node, and a converter circuit configured to generate a particular voltage level on a boost node using a voltage level of the switch node. An output circuit is configured to provide the particular voltage level on the regulated power supply node using a voltage level of the boost node. In response to a determination that the regulated power supply node has been shorted to ground, the output circuit is configured isolate the boost node from the regulated power supply node. In response to a detection of a regulation event, the output circuit is configured to reduce the voltage level of the boost node to generate a reduced voltage on the regulated power supply node.

In various embodiments, the output circuit (disconnect switch) includes an analog driver and a digital driver. Respective outputs of the analog driver and digital driver are coupled to a control terminal of a pass device (e.g., a gate terminal of a transistor) that is coupled between the boost node and the regulated power supply node. The output circuit may operate under control of the analog driver in a first mode, when the voltage on the regulated power supply node is less than the voltage on the input power supply node. When the voltage on the regulated power supply node is greater than the voltage on the input power supply node, the output circuit may operate in a second mode under control of the digital driver.

BRIEF DESCRIPTION OF THE DRAWINGS

The following detailed description makes reference to the accompanying drawings, which are now briefly described.

DETAILED DESCRIPTION OF EMBODIMENTS

Power converters are used as power management building blocks in a number of applications, including portable applications. Among the types of power converters used in various applications are switching power converters, DC-DC converters that provide a regulated supply voltage based on an input voltage (e.g., from a battery). Switching power converters can be divided into boost converters (in which the regulated supply voltage is greater than the input voltage) and buck converters (in which the regulated supply voltage is less than the input voltage). Both buck and boost converters include at least one inductor in which energy is accumulated during operation.

When a power converter is connected to an input power source, an uncontrolled current (e.g., an inrush current) can pre-charge the output node of the converter to an undesired level due to the difference between the input and output voltages. Furthermore, in the event that a node of the power converter becomes shorted to ground, energy accumulated in the inductor can discharge and thus cause damage to other components (e.g., circuitry within a load).

The present disclosure is directed to an output circuit that implements, for a power converter, a disconnect switch. The disconnect switch is, in various embodiments, coupled between an output node of the converter (e.g., a boost node for a boost converter) and a regulated supply voltage node that may be coupled to a load circuit. The disconnect switch may operate under analog control in a first mode and under digital control in a second mode. During a startup condition (e.g., when a power source is first connected to an input voltage node), the output circuit, under control of an analog driver, limits any inrush current to acceptable levels that may prevent rapid charging of the output node (or regulated supply voltage node) to undesired levels. The analog driver may also cause the power converter to be isolated from the regulated supply voltage node in response to the latter becoming shorted to ground. Additionally, the analog driver may also allow the safe dissipation of energy during a electrostatic discharge (ESD) event. When operating under digital control, the output circuit may operate as a switching. The digital driver may close the switch to convey the voltage on, e.g., the boost node to the regulated supply voltage node. The digital driver may also open the switch to disconnect the regulated supply voltage node from, e.g., the boost node.

In various embodiments, the output circuit includes a pass device coupled between the output (e.g., boost node) of the converter stage and the regulated supply voltage node, an analog driver, a digital driver, and a charge pump to power the digital driver. The output circuit may also include a comparator or other circuitry to control whether operation occurs in the first (analog) mode or the second (digital) mode. Using the various control mechanisms, the disconnect switch may operate as an open switch (e.g., to provide load isolation), as a closed switch (e.g., during normal power conversion operations) or as a high threshold diode (e.g., during startup or in response to a short circuit).

Various embodiments of an output circuit/disconnect switch used with a power converter are now discussed in further detail. The discussion begins with a basic block diagram of one embodiment, followed by discussion of schematics of an embodiment along with the various parts thereof. Discussion of embodiments of multiphase power converters having one or more output circuits follows. A method for operating an embodiment of an output circuit coupled to a power converter is also disclosed, with the description concluding by illustrating an example system in which it may be implemented.

Figure 1:
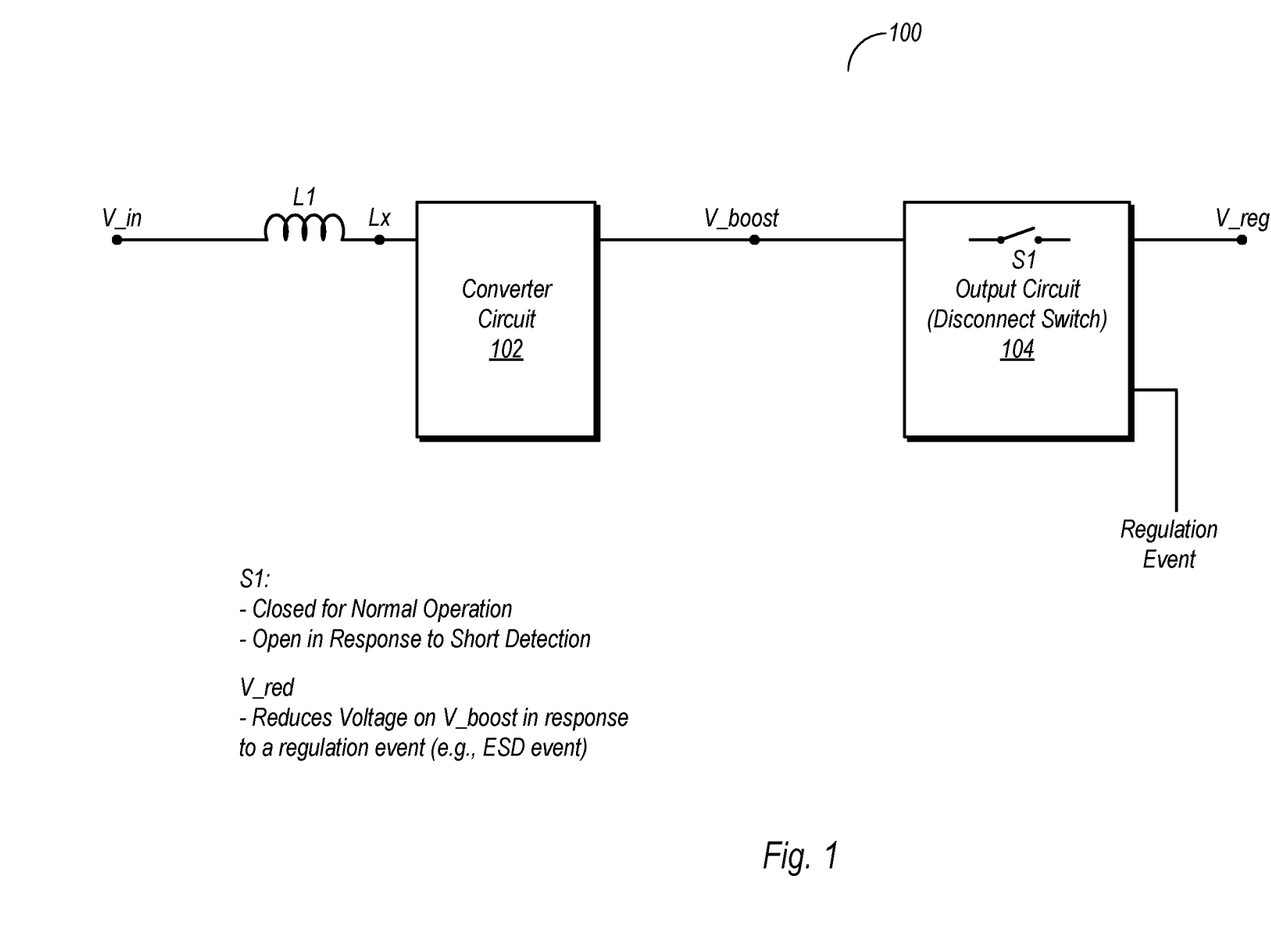
FIG. 1 is a block diagram of one embodiment of an apparatus including a power converter and a disconnect switch.

Power Converter with Disconnect Switch:

Turning now to FIG. 1, a block diagram of one embodiment of an apparatus including a power converter and a disconnect switch is shown. In the embodiment shown, circuit 100 includes a converter circuit 102 and an output circuit 104. An inductor L1 is coupled between an input voltage node, V_in, and a switching node Lx. Output circuit 104 is coupled between the boost node V_boost and a regulated supply voltage node, V_reg, and includes a switch, S1, which may implement the functions of a disconnect switch in accordance with the disclosure. When open, switch S1 isolates the regulated supply voltage node from the boost node. In the embodiment shown, circuit 100 implements a boost converter in which the output voltage (provided on the regulated supply voltage node) is greater input voltage provided on the input voltage node. However, while a boost converter is used here as an example, the disclosure is not limited to this type of power converter, and thus other types (e.g., buck converters) are possible and contemplated.

During operation, the output circuit is configured to provide the particular voltage level on the regulated power supply node using a voltage level of the boost node when switch S1 is closed. When S1 is closed during normal operation, the voltage on the boost node is conveyed to the regulated supply voltage node. However, in certain conditions, S1 may be opened, thereby isolating the regulated supply voltage node from the boost node. For example, switch S1 may be opened when the boost converter is in a sleep mode.

Output circuit 104 in the embodiment shown is coupled to receive an indication of the detection of a regulation event. In response to the detection of the regulation event, output circuit 104 may operate clamp the voltage between the boost node and the regulated power supply node. One example of a regulation event is an inrush current that may occur during a start-up of the boost converter of the embodiment shown. An electrostatic discharge (ESD) event is another example of a regulation event. Clamping the voltage between the boost node and the regulated supply voltage node during an ESD event, in a controlled manner, may prevent damage to other circuits, including those of converter circuit 102.

Figure 2:
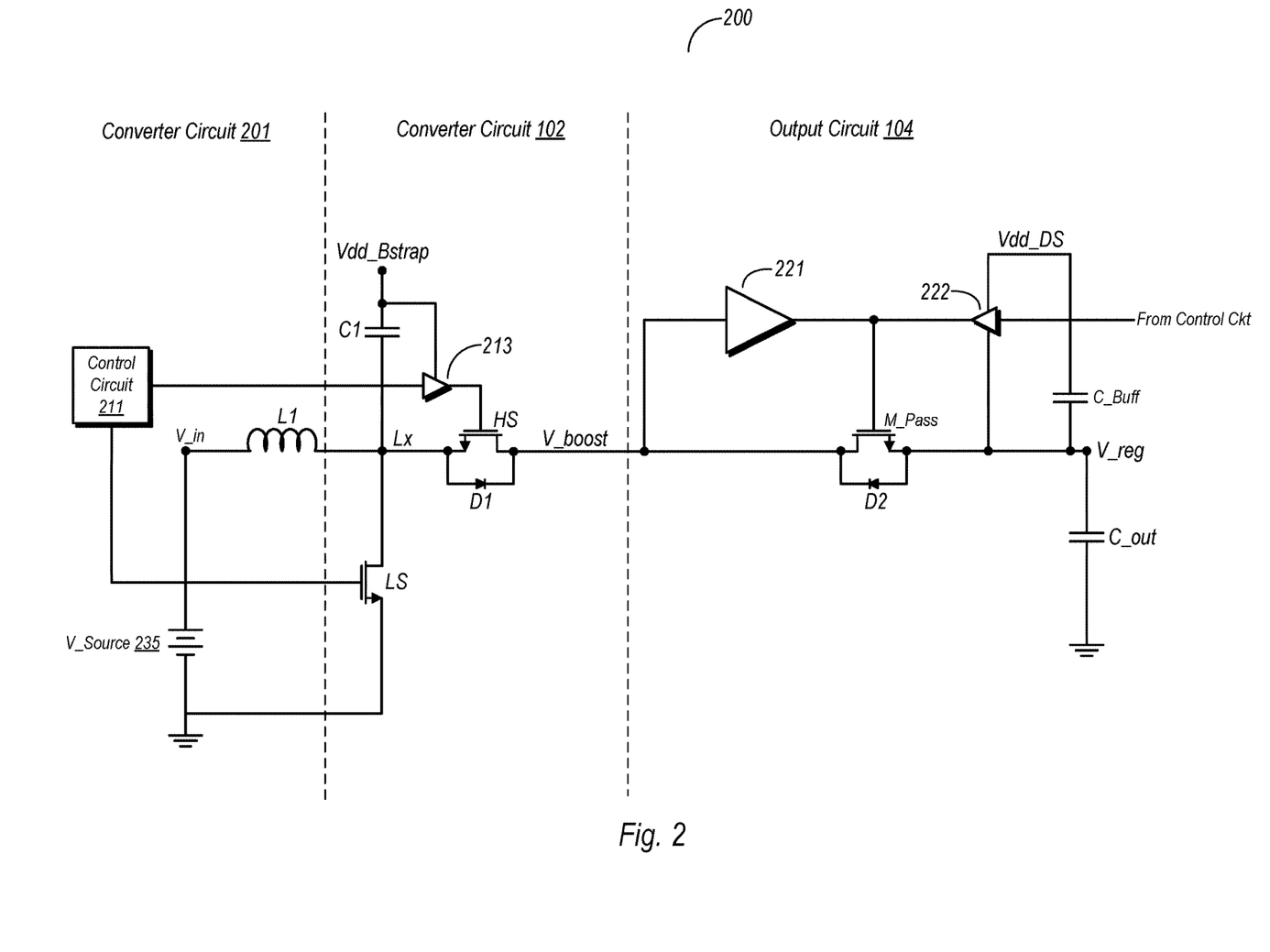
FIG. 2 is a schematic diagram illustrating one embodiment of a disconnect switch coupled to a stage of a power converter.

Circuit Schematics:

FIG. 2 is a schematic diagram illustrating one embodiment of a disconnect switch coupled to a stage of a power converter. In the embodiment shown, circuit 200 includes an input circuit 201, along with embodiments of a converter circuit 102 and output circuit 104. As with the embodiment discussed above in reference to FIG. 1, circuit 200 implements a boost converter.

Input circuit 201 in the embodiment shown includes a voltage source 235 configured to generate and provide an input voltage that is received on the node V_in. And inductor L1 is coupled between the input voltage node V_in and a switching node Lx in converter circuit 102. A control circuit 211 is configured to control the switching states of devices in the converter circuit 102. Although not explicitly shown here, control circuit 211 may receive some form of feedback to allow for closed-loop control and regulation of the regulated supply voltage provided on the V_reg output of output circuit 104.

Converter circuit 102 in the embodiment shown includes a high side switch HS and a low side switch LS. In this particular embodiment, switches HS and LS are implemented using NMOS transistors, although the disclosure is not limited to these types of devices, nor is it limited to CMOS/FET transistors in general. A diode D1 is shown as being implemented between the source and drain terminals of high side switch HS, which may be a discrete diode or an intrinsic body diode between these two nodes. Converter circuit 102 in the embodiment shown also includes a capacitor C1 and a gate driver 213. Capacitor C1 is coupled between the switching node LX and a voltage supply node, Vdd_Bstrap, which is coupled to another voltage source (not shown). Gate driver 213 in the embodiment shown is configured to operate using the supply voltage obtained via Vdd_Bstrap.

Control circuit 211 in the embodiment shown is configured to operate the high side and low side switches HS and LS, respectively in order to generate a boost voltage on the node V_boost. As per normal boost converter operation, the boost converter implemented in converter circuit 200 trades current for a voltage on the boost node, V_boost, that is greater than that of the voltage provided by V_Source 235. This voltage may initially be generated on the switching node Lx and transferred to V_boost when high side switch HS is closed.

Output circuit 104 in the embodiment shown includes a passgate transistor, M_Pass, which operates as a disconnect switch (e.g., similar to switch S1 of FIG. 1). In the illustrated embodiment, M_Pass is implemented as an NMOS device, although the disclosure is not limited to this particular type. A diode D2 is coupled between the source and drain nodes of this device, and as with that of the high side switch HS, may be a discrete component or an intrinsic body diode. Output circuit 104 also includes an analog driver 221 and a digital driver 222. The digital driver 222, and a portion of the analog driver 221, may operate based on a supply voltage Vdd_DS provided from a corresponding voltage source (one possible embodiment of which is discussed in further detail below with reference to FIG. 4). A capacitor C_buff is coupled between Vdd_DS and the regulated supply voltage node, V_reg. Output circuit 104 also includes an output capacitor C_out.

In the embodiment shown, output circuit 104 may operate in one of two different embodiments. The different modes in the embodiment shown are based on the driver that controls the operation of the passgate transistor M_Pass, which may act as a disconnect switch. When operating in a first mode, analog driver 221 controls the operation of M_Pass to turn this device on or off. When operating in the second mode, digital driver 222 controls the operation of M_Pass. More particularly, digital driver 222 in the embodiment shown is coupled to receive a control signal (e.g., from control circuit 211 in this embodiment, although other sources are possible and contemplated). M_Pass may be turned on or off in accordance with the state of the control signal.

Operation in one of the first and second modes in the embodiment shown is determined based on a relationship between the input voltage and the voltage on the regulated supply voltage node, V_reg. If the voltage on the regulated supply voltage node is less than the input voltage, output circuit 104 operates in the first mode, with analog driver 221 controlling operation of the passgate transistor M_Pass. When the voltage on the regulated supply voltage node is greater than the input voltage, output circuit 104 operates in the second mode, with M_Pass being controlled by digital driver 104.

Figure 3:
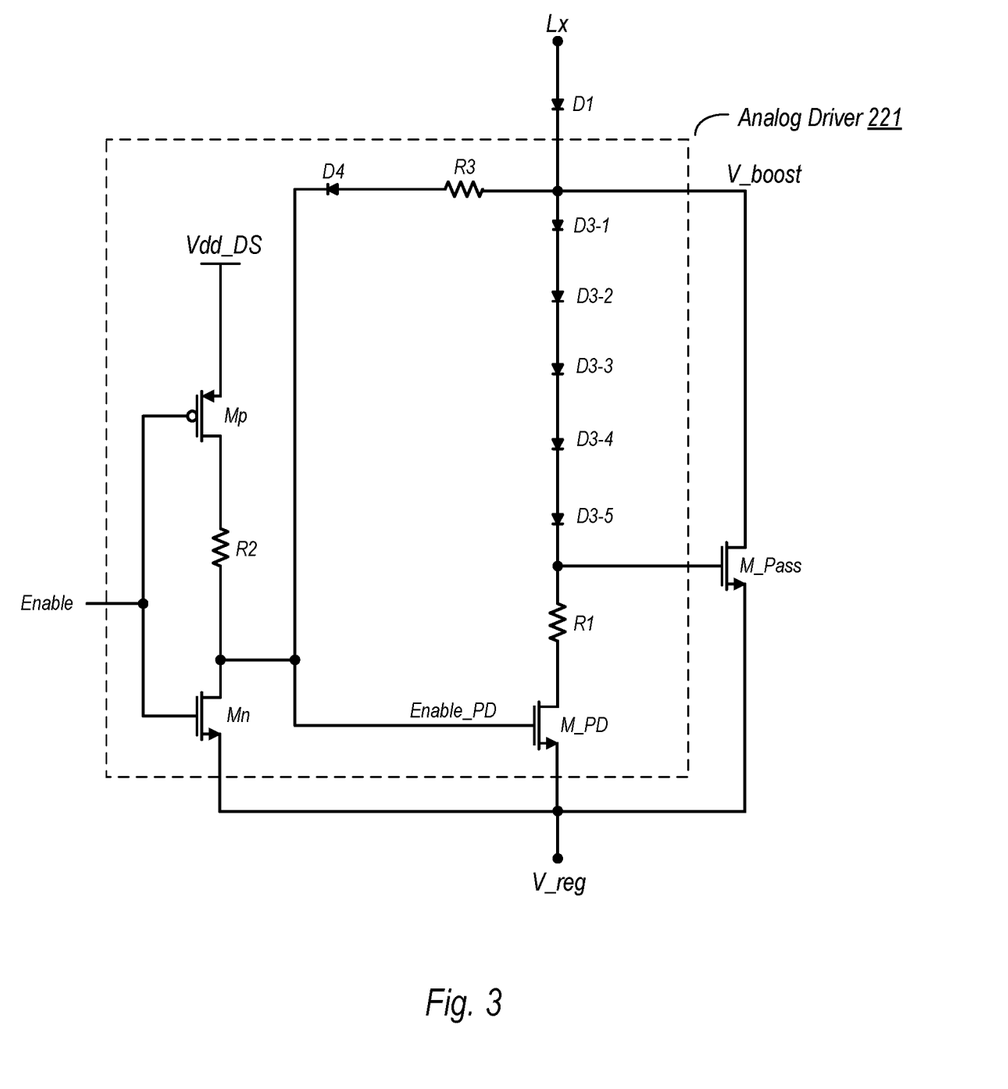
FIG. 3 a schematic diagram illustrating one embodiment of an analog driver for a disconnect switch.

Various aspects of the operation in the first mode, under the control of analog driver 221 are now explained in further detail. FIG. 3 is a schematic diagram illustrating one embodiment of an analog driver for a disconnect switch, such as M_Pass. In the embodiment shown, analog driver 221 is coupled to the switching node Lx via diode D1, which is coupled between the source and drain terminals of the high side switch HS1 as shown in FIG. 2. Diode D1 may be functional when the high side switch HS is open/off.

The boost node, V_boost, is coupled to the cathode of D1, while the switching node Lx is coupled to the anode. A plurality of series coupled diodes D3-1 to D3-5 are shown here as being coupled between the boost node V_Boost and the gate terminal of M_Pass. It is noted that the number of diodes may be higher or lower, in other embodiments, than what is shown here, depending on factors such as the maximum input voltage, the voltage rating of M_Pass, and so on. A resistor R1 is coupled between the gate terminal of M_Pass and the drain terminal another device M_PD. The source terminal of M_PD is coupled to the regulated supply voltage node. A resistor R3 is coupled between the boost node V_boost and the anode of another diode D4, the cathode of which is coupled to the gate terminal of M_PD at the node labeled Enable_PD.

An enable circuit includes a PMOS device Mp having a source terminal coupled to the supply voltage node Vdd_DS and a drain terminal coupled to resistor R2, which is arranged as a pull-up resistor in this embodiment. The other terminal of R2 is coupled to Enable_PD, and further coupled to the drain terminal of NMOS device Mn. The source terminal of Mn is coupled to V_reg. The respective gate terminals of Mp and Mn are coupled to receive an Enable signal from a voltage monitor circuit that will be discussed in further detail below. The enable circuit effectively acts as a controller for the device M_PD, activating and deactivating the device by asserting and de-asserting, respectively, the Enable_PD signal.

Operation of the illustrated embodiment analog driver 221 is now discussed. When operating in the first mode, transistor M_PD is on and thus one terminal of resistor R1 is effectively coupled to the regulated supply voltage node V_reg. The activation of M_PD is performed by the enable circuit implemented with devices Mp and Mn, along with resistor R2 arranged in a pull-up configuration.

When a current is forced into the switching node Lx, either from the inductor L2 or from an ESD event, the gate terminal of M_Pass is clamped to the voltage on V_boost minus the combined diode drops of the diodes in the path. Accordingly, the full drain-source voltage across M_Pass at this time is the combined diode drop voltages of D3-1 to D3-5 plus its gate-source voltage. When the inductor L1 is discharged or the ESD event terminates, the pulldown resistor R1 may cause a controlled de-activation of M_Pass.

Excluding the inverter portion that includes Mp and Mn, the remainder of analog driver 221 is effectively self-supplied, and may be activated either by a high on Enable_PD or by the voltage on the cathode of D4. In one embodiment, the series-coupled diodes D3-1 to D3-5 may be implemented using intrinsic NPN transistors in order to reduce the process and temperature sensitivity of the circuit.

As noted above, analog driver 221 may be operational in the first mode when the voltage on V_reg is less than the input voltage. This condition may occur during a startup of the correspondingly coupled power converter. Accordingly analog driver 221 may implement one of the functions of the voltage reduction circuit of FIG. 1 by controlling the inrush currents that may occur during the startup. During the system startup of the illustrated embodiment, the Enable signal received by devices Mp and Mn is low. Thus Mp is activated and the Enable_PD signal is pulled high. This in turn causes activation of M_PD, and thus inrush currents are controlled through this device, resistor R1, and the series-coupled diodes D3-1 to D3-5.

Safely discharging current during an ESD event is another mechanism by which analog driver 221 implements the functions of the voltage reduction circuit 103 of FIG. 1. When an ESD event occurs and the Enable_PD is in an indeterminate state (due to neither of Mp nor Mn being active), the series-coupled diodes D3-1 to D3-5 may, in a controlled manner, cause the voltage on the gate terminal of M_Pass to rise to a value sufficient to activate this device. When M_Pass is active, current may be safely discharged until the voltage on V_boost, and correspondingly, the gate voltage falls to a value low enough to cause a safe deactivation of the device.

Figure 4:
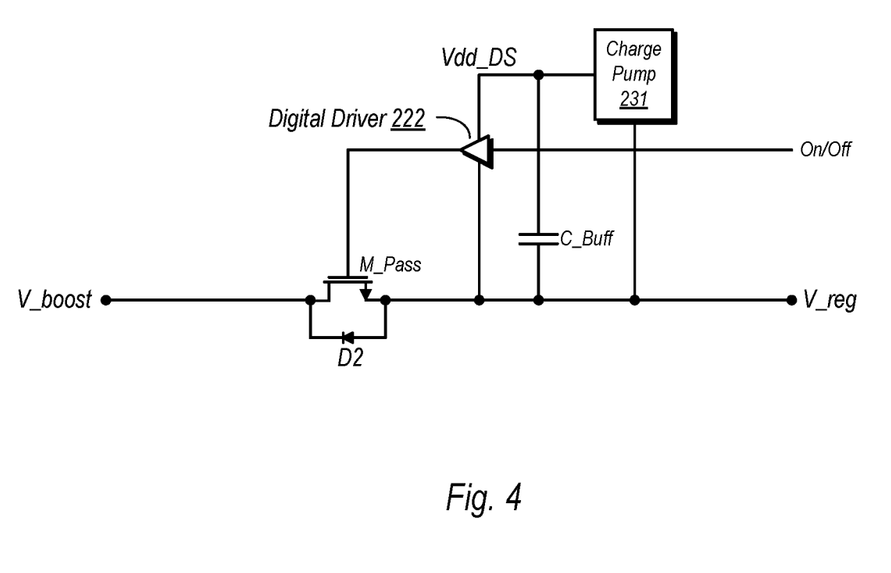
FIG. 4 is a schematic diagram illustrating the arrangement of a digital driver for one embodiment of a disconnect switch.

FIG. 4 is a schematic diagram illustrating the arrangement of a digital driver for one embodiment of a disconnect switch. When operating in the second mode, the digital driver is configured to control a state of the M_Pass. As previously noted, operation in the second mode may occur when a voltage on the regulated power supply node V_reg is greater than an input voltage provided on the input supply voltage node, V_in.

In the embodiment shown, digital driver 222 is implemented as a buffer coupled to receive a control signal, On/Off from, e.g., control circuit 211 of FIG. 1. The output of buffer 222 is coupled to the gate terminal of M_Pass. A diode D2 is coupled between the source and drain terminals of M_Pass, the anode thereof being coupled to the source terminal.

Digital driver 222 in the embodiment shown is powered by a supply voltage Vdd_DS. A capacitor C_Buff is coupled between Vdd_DS and V_reg. The source of Vdd_DS in this embodiment is a charge pump 231, which may be implemented using any suitable charge pump circuitry. It is noted that in various embodiments, Vdd_DS may also supply the enable circuit of the analog driver 221 as discussed above in reference to FIG. 3. However, since the voltage on the V_reg node is less than that on the input voltage node V_in when operating in the first mode (and thus under control of analog driver 221), Vdd_DS may be a lower voltage than when operating in the second mode (when the voltage on V_reg>V_in). When operating in the first mode, digital driver 222 may be tri-stated to allow analog driver 221 to control M_Pass.

During operation in the second mode, the On/Off signal received by digital driver 222 may be on when the correspondingly coupled power converter is operating to provide a regulated supply voltage. When in the on state, M_Pass is active and allows the voltage on V_boost to be conveyed to the regulated supply voltage node V_reg. If the correspondingly coupled power converter is put into a sleep mode, the On/Off signal may be received in the off state, and thus M_Pass is inactive, thereby isolating V_reg from V_boost.

Figure 5:
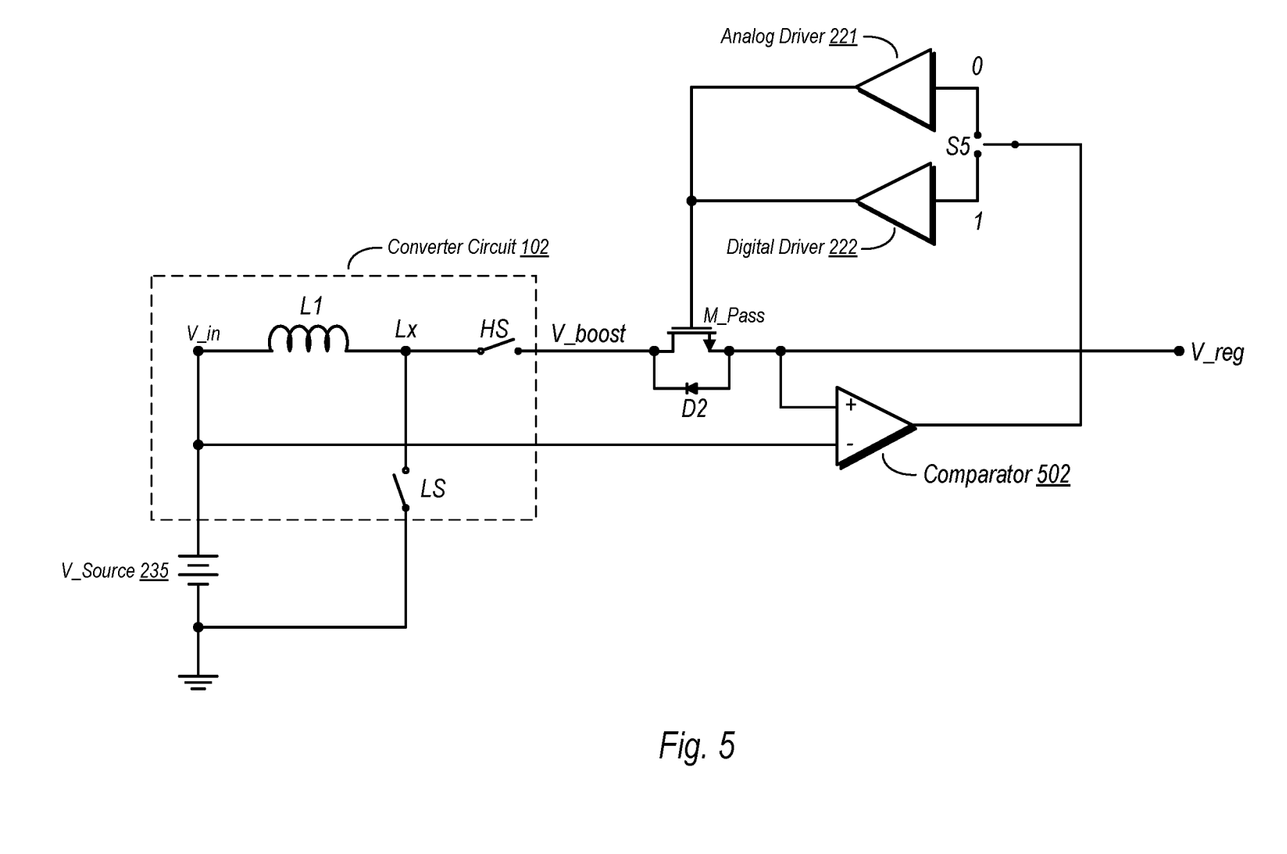
FIG. 5 is a schematic diagram illustrating one embodiment of a mode select circuit used to determine a mode of operation for a disconnect switch.

FIG. 5 is a schematic diagram illustrating one embodiment of a mode select circuit used to determine a mode of operation for a disconnect switch. In the embodiment shown, a mode select circuit is implemented using comparator 502. The non-inverting input of comparator 502 is coupled to the regulated supply voltage node. The inverting input of comparator 502 is coupled to the input voltage node, V_in. Comparator 502 is configured to compare these two values to determine the mode of operation with respect to the disconnect switch implemented by M_Pass, and its control in these modes by one of analog driver 221 and digital driver 222.

When comparator 502 detects that the voltage on V_in is greater the voltage on V_reg, comparator 502 outputs a logic zero. In response, switch S5 selects analog driver 221 as the controlling circuit for M_Pass. This condition may occur at various times, such as during a startup of converter circuit 102 and thus when the voltage on V_reg has not yet been raised to at least the same value as the input voltage. Referring briefly back to FIG. 2, when switch S5 is in the '0' position, selecting analog driver 221, the Enable signal may be received (e.g., via an inverter that is not shown here).

Once the voltage on V_reg has risen to a point at which it is greater than the input voltage on V_in, comparator 502 in the embodiment shown outputs a logic one to select digital driver 222 to control M_Pass and thus cause operation in the second mode. As a result, when the boost converter is not switching, M_Pass may be activated or de-activated in accordance with a control signal received by digital driver, as explained above in reference to FIG. 4.

Figure 6:
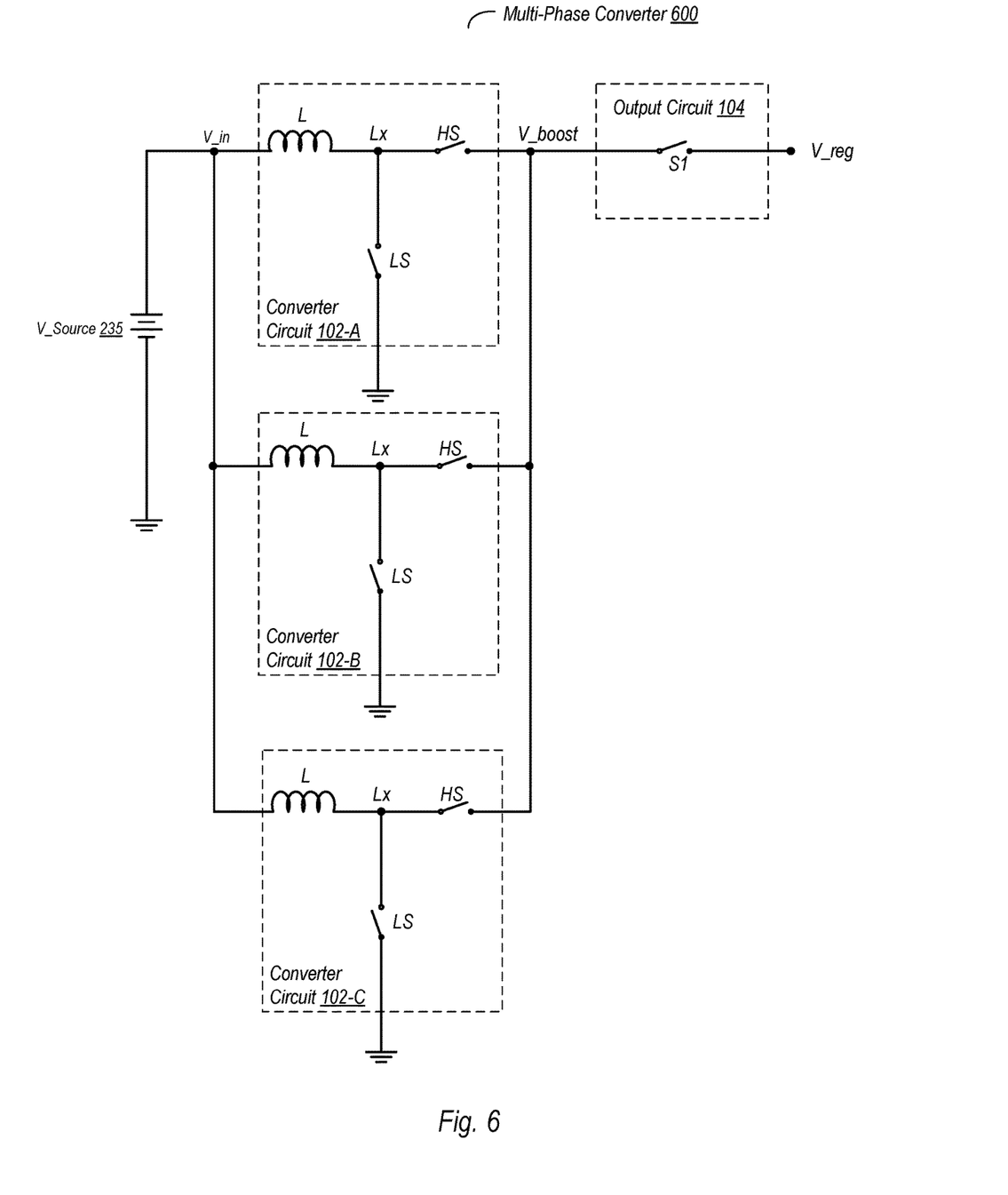
FIG. 6 is a diagram illustrating the arrangement of a multi-phase power converter having a disconnect switch.

Power Converter Embodiments Utilizing Disconnect Switch:

FIG. 6 is diagram illustrating one embodiment of a multi-phase power converter implemented with a disconnect switch. In the embodiment shown, multi-phase converter 600 is a boost converter having three different phases (although the number of phases is not intended to be limiting). The phases here include converter circuit 102-A, 102-B, and 102-C. An input voltage source 235 is configured to provide an input voltage on the node V_in, which in turn is coupled to the respective inductors of the various power converter phases. Additionally, each of the phases is coupled to a common boost node, V_boost. Although not explicitly shown here, control circuitry may be implemented to perform various tasks, including adding and shedding phase, and more generally, actions to maintain a regulated supply voltage on the V_reg node within specified limits.

In this particular embodiment, multi-phase converter 600 is a boost converter, with each phase implementing a boost converter phase. However, the disclosure is not limited in this manner, and thus embodiments implementing, e.g., buck converters are also possible and contemplated.

Multiphase converter 600 in the embodiment shown includes an output circuit 104 that implements a disconnect switch S1. Output circuit 104 may be implemented using any of the circuit and apparatus embodiments discussed above. Furthermore, embodiments of a circuit/apparatus capable of carrying out the functions described for the circuits discussed above but not explicitly discussed herein may also be used to implement output circuit 104 (and may thus also fall within the scope of this disclosure). In this particular embodiment, a single instance of output circuit 104 is provided for all of the phases of multi-phase converter 600.

Figure 7:
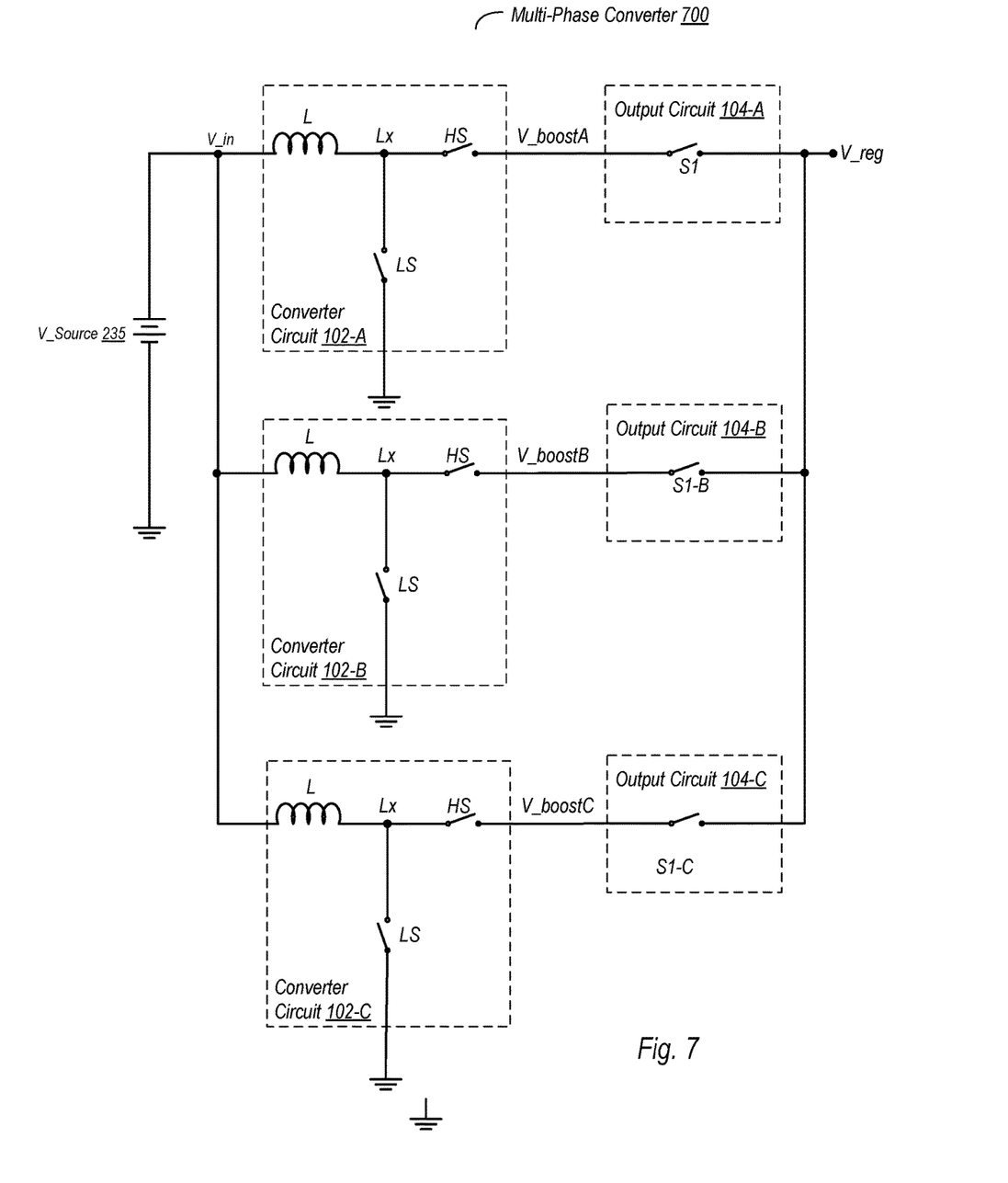
FIG. 7 is a diagram illustrating the arrangement of a multi-phase power converter with each phase having a disconnect switch.

FIG. 7 is a diagram illustrating another embodiment of a multi-phase converter. In the embodiment shown, multi-phase converter 700 is similar to that of FIG. 6 in that it includes three stages and implements a boost converter (but does not limit the disclosure in the number and types of converter phases).

In contrast to the embodiment of FIG. 6, the power converter phases of multi-phase converter 700 do not share a common boost node. Similarly, these phases do not share a common output circuit 104 that implements a disconnect switch. Instead, each phase has a unique boost node (e.g., V_boostA, etc.) which is coupled to a unique output circuit (e.g., output circuit 104-A). Each of the output circuits 104-A, 104-B, and 104-C may carry out the various functions of an output circuit as described above with reference to FIGS. 1-5. The output circuits 104-A to 104-C may be implemented using the various circuits discussed herein, or other circuits that are differently arranged but carry out the functions of an output circuit per this disclosure.

It is noted that while the circuits discussed above have been implemented using NMOS and PMOS transistors, the disclosure is not intended to limit embodiments falling within its scope to these types of devices. Thus, in addition to various MOSFET types discussed above, the present disclosure also contemplates embodiments that use non-planar devices such as FinFETs, GAAFETs (Gate All Around FETs), among other types. Embodiments implemented using Bipolar devices are also possible and contemplated. The disclosure further contemplates that technologies that are speculative as of this writing may be used to implement devices in various embodiments of the circuits discussed herein. These technologies include (but are not limited to) graphene transistors, carbon nanotube transistors, gallium arsenide transistors, and so on.

Figure 8:
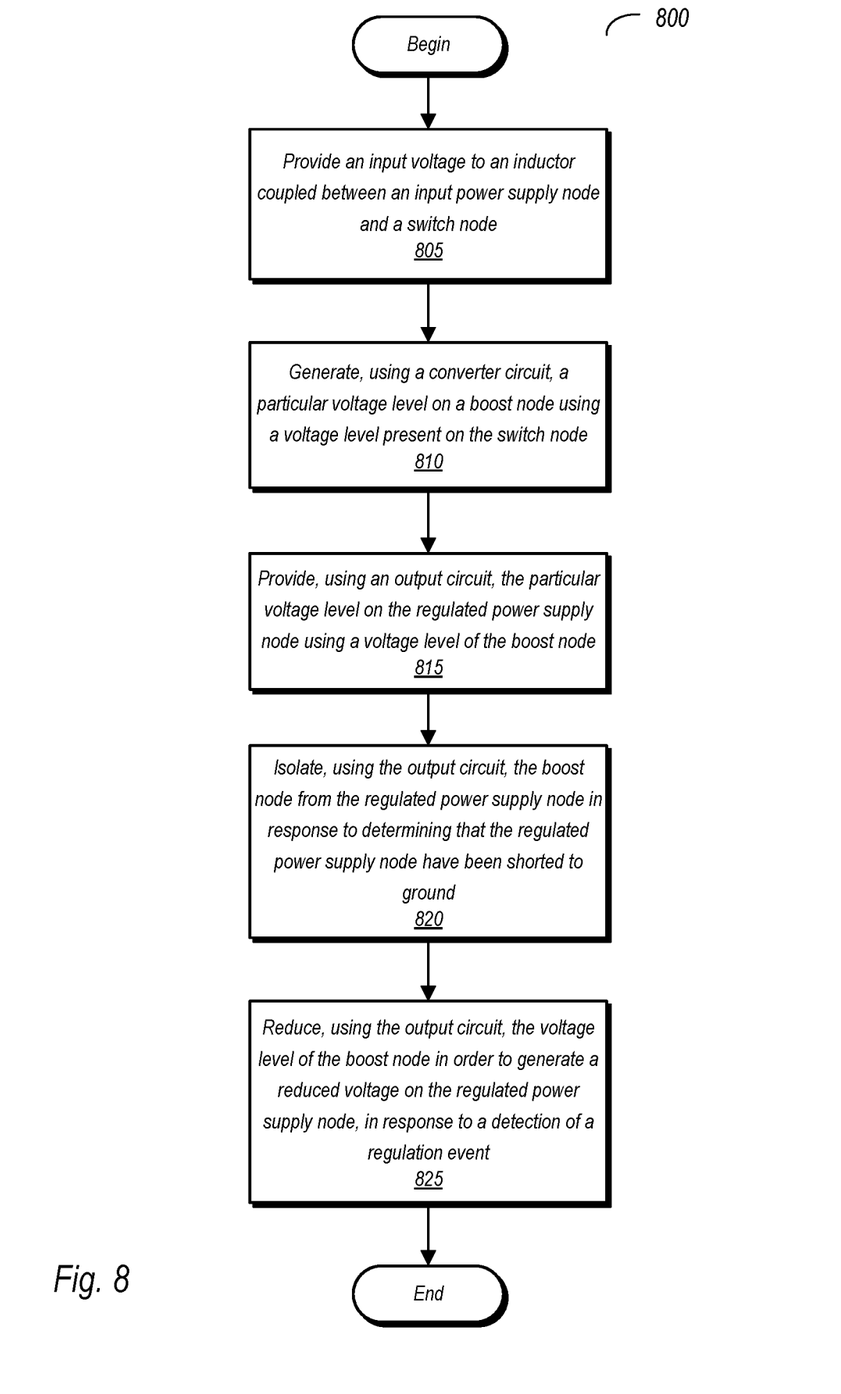
FIG. 8 is a flow diagram of one embodiment of a method for operating a power converter with a disconnect switch.

Method for Operating a Power Converter with a Disconnect Switch:

FIG. 8 is a flow diagram of one embodiment of a method for operating a power converter having a disconnect switch. Method 800 may be carried out by any of the various circuit embodiments discussed above. Embodiments of circuits capable of carrying out Method 800 but not disclosed herein are also considered to fall within the scope of this disclosure.

Method 800 includes providing an input voltage to an inductor coupled between an input power supply node and a switch node (block 805). The method further includes generating, using a converter circuit, a particular voltage level on a boost node using a voltage level present on the switch node (block 810) and providing, using an output circuit, the particular voltage level on the regulated power supply node using a voltage level of the boost node (block 815). The method also includes isolating, using the output circuit, the boost node from the regulated power supply node in response to determining that the regulated power supply node have been shorted to ground (block 820) and reducing, using the output circuit, the voltage level of the boost node in order to generate a reduced voltage on the regulated power supply node, in response to a detection of a regulation event (block 825).

In some embodiments, a regulation event includes at least one of an inrush current during a start-up of the boost circuit and/or an electrostatic (ESD) discharge event.

Some embodiments of the method further include comparing, using a comparator circuit, the particular voltage on the regulated power supply node to the input voltage. Such embodiments further include operating the output circuit in a first mode in response to the comparator circuit determining that the particular voltage is less than the input voltage operating the output circuit in a second mode in response to the comparator circuit determining that the particular voltage is greater than the input voltage. Operating in the first mode comprises an analog driver controlling a pass device of the output circuit, while operating in the second mode comprises a digital driver controlling the pass device.

Various embodiments may also include generating, using a charge pump, a supply voltage for the digital driver when operating the output circuit in the second mode. These embodiments may also include causing, using the digital driver, a pass device to close such that the particular voltage level is provided on the regulated power supply node, and isolating the boost node from the regulated supply node, wherein the isolating comprises using the digital driver to cause the pass device to open.

Reducing the voltage level on the boost node comprises, in various embodiments, providing a plurality of diode drops in a plurality of diodes coupled in series between the switch node and a control terminal of a pass device, wherein the pass device is activated according to a voltage on a cathode of a last one of the plurality of diodes coupled in series.

Figure 9:
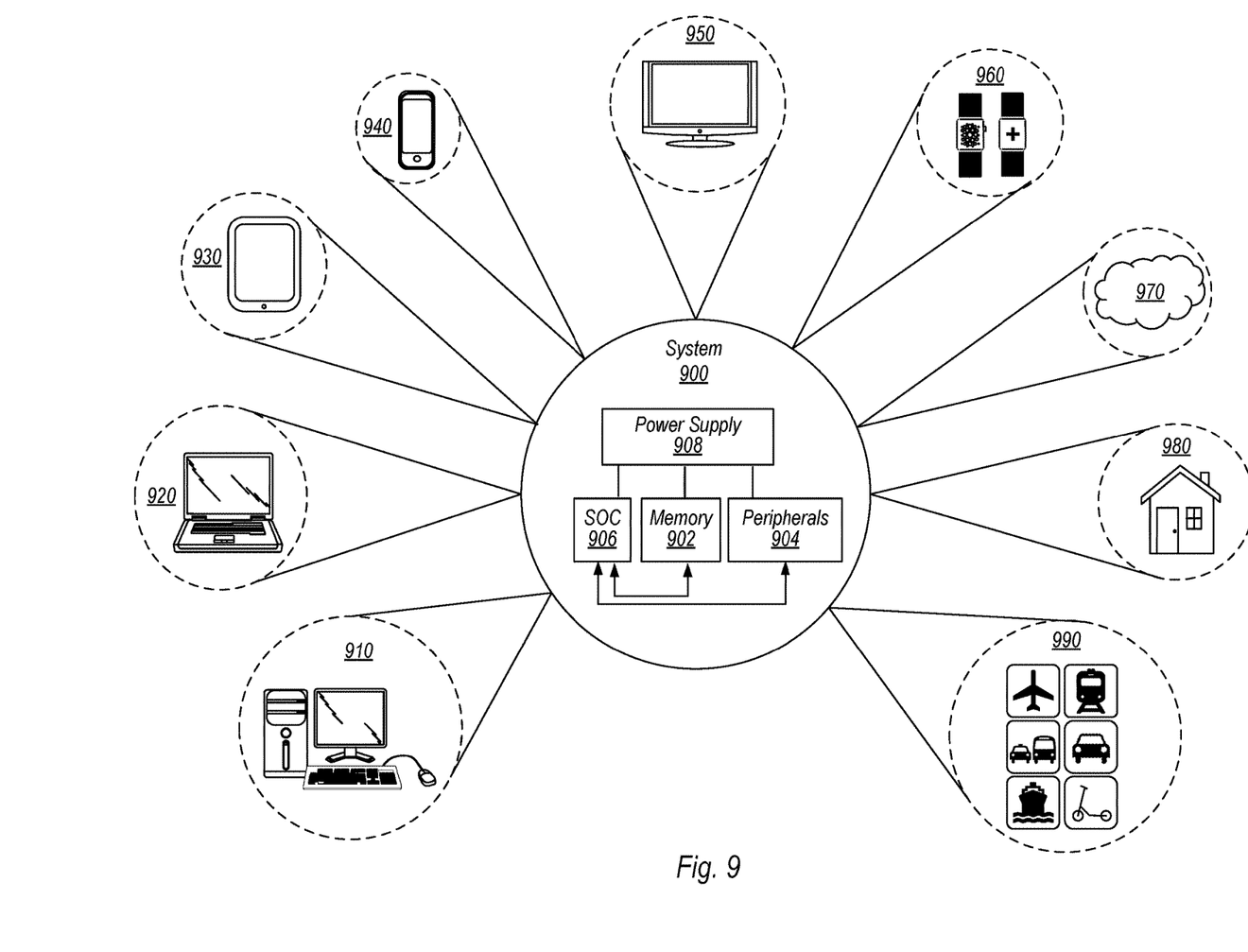
FIG. 9 is a block diagram of one embodiment of an example system.

Example System:

Turning next to FIG. 9, a block diagram of one embodiment of a system 900 is shown that may incorporate and/or otherwise utilize the methods and mechanisms described herein. In the illustrated embodiment, the system 900 includes at least one instance of a system on chip (SoC) 906 which may include multiple types of processing units, such as a central processing unit (CPU), a graphics processing unit (GPU), or otherwise, a communication fabric, and interfaces to memories and input/output devices. In some embodiments, one or more processors in SoC 906 includes multiple execution lanes and an instruction issue queue. In various embodiments, SoC 906 is coupled to external memory 902, peripherals 904, and power supply 908.

A power supply 908 is also provided which supplies the supply voltages to SoC 906 as well as one or more supply voltages to the memory 902 and/or the peripherals 904. In various embodiments, power supply 908 represents a battery (e.g., a rechargeable battery in a smart phone, laptop or tablet computer, or other device). In some embodiments, more than one instance of SoC 906 is included (and more than one external memory 902 is included as well).

The memory 902 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 904 include any desired circuitry, depending on the type of system 900. For example, in one embodiment, peripherals 904 includes devices for various types of wireless communication, such as Wi-Fi, Bluetooth, cellular, global positioning system, etc. In some embodiments, the peripherals 904 also include additional storage, including RAM storage, solid state storage, or disk storage. The peripherals 904 include user interface devices such as a display screen, including touch display screens or multi-touch display screens, keyboard or other input devices, microphones, speakers, etc.

System 900 may include one or more instances of a bandgap circuit as disclosed herein. Instances of the bandgap circuit may be used, for example, to implement temperature sensors, for reference voltage generation, and so on.

As illustrated, system 900 is shown to have application in a wide range of areas. For example, system 900 may be utilized as part of the chips, circuitry, components, etc., of a desktop computer 910, laptop computer 920, tablet computer 930, cellular or mobile phone 940, or television 950 (or set-top box coupled to a television). Also illustrated is a smartwatch and health monitoring device 960. In some embodiments, smartwatch 960 may include a variety of general-purpose computing related functions. For example, smartwatch 960 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 900 may further be used as part of a cloud-based service(s) 970. For example, the previously mentioned devices, and/or other devices, may access computing resources in the cloud (i.e., remotely located hardware and/or software resources). Still further, system 900 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 9 is the application of system 900 to various modes of transportation. For example, system 900 may be used in the control and/or entertainment systems of aircraft, trains, buses, cars for hire, private automobiles, waterborne vessels from private boats to cruise liners, scooters (for rent or owned), and so on. In various cases, system 900 may be used to provide automated guidance (e.g., self-driving vehicles), general systems control, and otherwise. These any many other embodiments are possible and are contemplated. It is noted that the devices and applications illustrated in FIG. 9 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something; physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
    an inductor coupled between an input power supply node and a switch node;
    a converter circuit configured to generate a particular voltage level on a boost node using a voltage level of the switch node; and
    an output circuit coupled between the boost node and a regulated power supply node, wherein the output circuit is configured to:
        provide the particular voltage level on the regulated power supply node using a voltage level of the boost node;
        in response to a determination that the regulated power supply node has been shorted to ground, isolate the boost node from the regulated power supply node; and
        in response to a detection of a regulation event, clamp a voltage level between the boost node and the regulated power supply node.

2. The apparatus of claim 1, wherein the output circuit includes:
    a pass device coupled between the boost node and a regulated power supply node;
    an analog driver having an output coupled to a control terminal of the pass device, wherein the analog driver is configured to control the pass device when the output circuit is operating in a first mode; and
    a digital driver coupled to the control terminal of the pass device, wherein the digital driver is configured to provide an output control signal, to the control terminal of the pass device, based on an input control signal, and wherein the digital driver is configured to control the pass device when the output circuit is operating in a second mode.

3. The apparatus of claim 2, further comprising a charge pump coupled to the regulated power supply node, wherein the digital driver is coupled to receive an output voltage provided by the charge pump, wherein the output voltage provided by the charge pump is greater than the particular voltage provided on the regulated power supply node.

4. The apparatus of claim 3, wherein the digital driver is configured to control a state of the pass device when a voltage on the regulated power supply node is greater than an input voltage provided on the input power supply node.

5. The apparatus of claim 2, wherein the analog driver includes a plurality of series-coupled diodes coupled between the switch node and the control terminal of the pass device, wherein an anode of a first one of the plurality of series-coupled diodes is coupled to the switch node, and wherein a cathode of a last one of the plurality of series-coupled diodes is coupled to the control terminal of the pass device.

6. The apparatus of claim 5, wherein the analog driver further includes:
    a first resistor having a first terminal coupled to the control terminal of the pass device;
    a pull-down device having a control terminal, a first terminal coupled to a second terminal of the first resistor, and a second terminal coupled to the regulated power supply node; and
    a control circuit coupled to the control terminal of the pull-down device.

7. The apparatus of claim 6, wherein the control circuit is configured to activate the pull-down device when operating in the first mode.

8. The apparatus of claim 2, wherein, when the output circuit is operating in the first mode, the analog driver is configured to operate as a high-threshold diode during startup and short circuit conditions.

9. The apparatus of claim 2, wherein, when the output circuit is operating in the second mode, the digital driver is configured to cause the output circuit to operate as a switch, wherein the switch is configured to isolate the converter circuit from a load circuit when open and further configured to provide the particular voltage from the regulated power supply node when closed.

10. The apparatus of claim 2, further comprising a voltage monitor configured to compare particular voltage level on the regulated power supply node with an input voltage provided on the input power supply node, wherein the voltage monitor is configured to cause the output circuit to operate in the first mode when the particular voltage level is less than the input voltage, and further configured to cause the output circuit to operate in the second mode when the particular voltage level is greater than the input voltage.

11. A method comprising:
    providing an input voltage to an inductor coupled between an input power supply node and a switch node;
    generating, using a converter circuit, a particular voltage level on a boost node using a voltage level present on the switch node;
    providing, using an output circuit, the particular voltage level on a regulated power supply node using a voltage level of the boost node;

isolating, using the output circuit, the boost node from the regulated power supply node in response to determining that the regulated power supply node have been shorted to ground; and clamping, using the output circuit, a voltage between the boost node and the regulated power supply node, in response to a detection of a regulation event.

12. The method of claim 11, wherein the regulation event comprises one of:

an inrush current during a start-up of the converter circuit;

an electrostatic discharge event.

13. The method of claim 11, further comprising:

comparing, using a comparator circuit, the particular voltage on the regulated power supply node to the input voltage;

operating the output circuit in a first mode in response to the comparator circuit determining that the particular voltage is less than the input voltage; and operating the output circuit in a second mode in response to the comparator circuit determining that the particular voltage is greater than the input voltage;

wherein operating in the first mode comprises an analog driver controlling a pass device of the output circuit, and wherein operating in the second mode comprises a digital driver controlling the pass device.

14. The method of claim 13, further comprising:

generating, using a charge pump, a supply voltage for the digital driver when operating the output circuit in the second mode;

causing, using the digital driver, a pass device to close such that the particular voltage level is provided on the regulated power supply node; and isolating the boost node from the regulated power supply node, wherein the isolating comprises using the digital driver to cause the pass device to open.

15. The method of claim 13, wherein reducing the voltage level on the boost node comprises providing a plurality of diode drops in a plurality of diodes coupled in series between the switch node and a control terminal of a pass device, wherein the pass device is activated according to a voltage on a cathode of a last one of the plurality of diodes coupled in series.

16. A system comprising:

an input voltage source configured to generate an input voltage on an input voltage node;

a multi-phase boost converter comprising a plurality of phases coupled between the input voltage node and a common boost node, wherein ones of the plurality of phases include:

an inductor coupled between the input voltage node and a switch node;

a first switch coupled between the switch node and a ground node; and a second switch coupled between the switch node and a boost node; and an output circuit including a pass device coupled between the boost node and a regulated supply voltage node, wherein the output circuit is configured to:

operate in a first mode, wherein operating in the first mode includes an analog driver controlling the pass device, and wherein operating in the first mode further includes clamping a voltage between the boost node and the regulated supply voltage node in response to a detection of a regulation event; and operate in a second mode, wherein operating in the second mode includes a digital driver controlling the pass device to provide a regulated supply voltage, based on a voltage on the boost node, to the regulated supply voltage node.

17. The system of claim 16, wherein the output circuit is further configured to, in response to a determination that the regulated supply voltage node has been shorted to ground, isolate the boost node from the regulated supply voltage node.

18. The system of claim 16, further comprising a voltage comparator configured to compare the input voltage to the regulated supply voltage, wherein the voltage comparator is configured to cause the output circuit to operate in the first mode in response to determining that the regulated supply voltage is less than the input voltage, and further configured to cause the output circuit to operate in the second mode in response to determining that the regulated supply voltage is greater than the input voltage.

19. The system of claim 18, further comprising a charge pump configured to generate an output voltage based on the regulated supply voltage, wherein the digital driver is configured to operate using the output voltage as a supply voltage.

20. The system of claim 16, wherein the analog driver includes a plurality of diodes coupled in series between the switch node and a control terminal of the pass device, wherein, when operating in the first mode, the pass device is configured to operate based on a voltage present on a cathode of a last one of the plurality of diodes.

* * * * *